US005356059A

United States Patent [19]

Yanez et al.

[11] Patent Number: 5,356,059
[45] Date of Patent: Oct. 18, 1994

[54] BASKET OR TRAY FOR ATTACHMENT TO A WHEELCHAIR

[76] Inventors: John E. Yanez, 5 S 275 Naperville-Wheaton Rd., Naperville, Ill. 60563; John Sandford, 307 Elm St., Loda, Ill. 60506

[21] Appl. No.: 20,705

[22] Filed: Feb. 22, 1993

[51] Int. Cl.$^5$ .......... B60R 9/00
[52] U.S. Cl. .......... 224/42.43; 224/42.45 R; 280/304.1; 297/188
[58] Field of Search .......... 224/273, 275, 36, 32 A, 224/42.43, 42.45 R; 280/288.4, 304.1; 297/188, 194, DIG. 4

[56] References Cited

U.S. PATENT DOCUMENTS

| | | | |
|---|---|---|---|
| 2,904,237 | 9/1959 | Wasyluk | 224/42.45 R |
| 4,158,428 | 6/1979 | Bates | 224/275 |
| 4,257,545 | 3/1981 | Rhyan | 224/42.43 |
| 4,305,601 | 12/1981 | Berge | 280/304.1 |
| 4,339,063 | 7/1982 | Trubiano | 224/273 |
| 4,403,786 | 1/1983 | Ulics | 224/273 |
| 4,526,419 | 7/1985 | Bowman | 297/194 |
| 4,580,803 | 4/1986 | Davis | 297/DIG. 4 X |
| 4,659,099 | 4/1987 | Malone | 224/275 |
| 4,795,182 | 1/1993 | Dyess | 280/304.1 |

FOREIGN PATENT DOCUMENTS

| | | | |
|---|---|---|---|
| 0184492 | 6/1986 | European Pat. Off. | 280/304.1 |
| 8401335 | 4/1984 | PCT Int'l Appl. | 280/304.1 |

*Primary Examiner*—Glenn T. Barrett
*Attorney, Agent, or Firm*—Robert L. Marsh

[57] ABSTRACT

An attachment to a wheel chair, which may be in the form of a basket or a tray, has a substantially rigid planar base portion, which has two sides. A pair of legs extend downwardly from each side of the base and a foot is positioned at the bottom of each leg. Each foot is adapted to rest upon the forward outer edge of the seat or on a support member positioned just below the seat, one support member on each side of a wheelchair. The attachment also has a pair of arms, one arm extending rearward from each side of the base and at the distal end of each arm there is an inwardly extending finger. The inwardly extending fingers are adapted to fit around the outer edges of the upwardly extending back of a wheel chair.

10 Claims, 5 Drawing Sheets

BASKET OR TRAY FOR ATTACHMENT TO A WHEELCHAIR

The present invention relates to a basket or tray which is attachable to a wheel chair and specifically to a basket or tray which has arms which attach to the back of the wheel chair and legs which rest on the seat or frame.

BACKGROUND OF THE INVENTION

When a person who is confined to a wheel chair attempts to shop for groceries or the like in a store, the individual is unable to use conventional shopping carts and is limited to gathering items which the person can pile on his or her lap.

Efforts have been made in the past to provide baskets which are attachable to certain wheel chairs and permit the user to shop using a basket attached to the wheel chair for which it is designed. Typically, such prior baskets which have been designed to attach to specific wheel chairs are not adaptable to other wheel chairs other than those for which they have been specifically engineered. A typical basket which is attachable to a wheel chair for which it is designed is shown in U.S. Pat. No. 4,403,786. Other baskets can be attached using brackets located parallel to the arm rests of the wheel chair as shown in U.S. Pat. No. 4,526,419. Prior efforts to develope a basket or tray which is adaptable to a wide range of wheel chairs have resulted in small trays or baskets which extend across the arm rests of the wheel chair as shown in U.S. Pat. No. 4,659,099.

Although all of the foregoing references may be useful with wheel chairs for which they have been designed, none of them are usable on substantially all wheel chairs and carry a substantial amount of goods and, therefore, none of them are suitable for being provided by a store, for example, a grocery store, for attachment to the wheel chair belonging to any customer who enters the store. As a result, stores, including grocery stores, generally do not provide for baskets attachable to wheel chairs and customers confined to wheel chairs who do not provide their own baskets are extremely limited in the amount of merchandise that they can purchase at any one time.

It would be desirable to provide a support member which is attachable to a wide number of designs of wheel chairs. Such support members, when fitted with a basket, could be attached to the wheel chairs of most customers who enter a store for use within the store, and after merchandise has been moved to the customer's vehicle, the basket can be returned to the store as is done with shopping carts. Similarly, if the support structure is fitted with a tray, as for example in a cafeteria, a customer entering the cafeteria could attach a tray to his or her wheel chair and detach it upon completion of a meal.

SUMMARY OF THE INVENTION

Briefly, the present invention is a support structure for attachment to a wheel chair. All wheel chairs have a seat, each side of which is defined by a metal member, and all wheel chairs have an upstanding back which has substantially parallel upwardly extending outer edges. Along each side thereof, existing wheel chairs have an additional support member substantially parallel to the metal member defining the side of the seat.

The present invention has a body, which may be in the form of a basket or a tray having a substantially rigid planar base portion, which has two sides. A pair of legs extend downwardly from each side of the body portion and have a foot at the bottom thereof. Each foot is adapted to rest upon the forward outer edge of the seat or on one of the additional support member which is usually positioned just below the level of the seat.

The body further has a pair of rearwardly extending arms, one arm extending from each side of the body. At the distal end of each arm is an inwardly extending finger which is adapted to fit around one of the outer edges of the upwardly extending back of a wheel chair.

The width of the support structure is a little wider than any wheel chair to which the structure is to be attached, and the arms and the legs connect to the outer edges of the support structure. In their unstressed positions, the distal ends of each arm and each leg of the preferred embodiment converge toward the opposing arm or the opposing leg and are spring biased such that when the distal ends of the arms or the distal ends of the legs are separated from each other they will be urged to return to their unstressed positions. The arms and the legs can be made of a suitable spring quality steel with the distal ends of the arms and the legs angled towards each other such as described above such that the distal ends thereof must be spread apart when they are fitted over the portions of a wheel chair to which they are to connect.

In an alternate embodiment, the ends of the legs diverge from each other and each foot has an outwardly facing notch. Each notch receives a vertical member of the wheel chair, where one vertical member is positioned on each side of the wheel chair, such that the legs are positioned between the vertical members. In another embodiment, each foot is adapted to fit upon one of the additional support members which are located parallel to and below each of the sides of the seat.

A support structure constructed in accordance with the present invention can be fitted on most any wheel chair by spreading the legs thereof sufficiently far apart such that one foot will fit over each of the side of the front of the seat and spreading the arms sufficiently far apart to enable the fingers to extend around the outer edges of the seat and thereby retain the support structure.

BRIEF DESCRIPTION OF THE DRAWINGS

The objects and advantages as described above, and a better understanding of the invention will be had by reference to the following detailed description taken in conjunction with the accompanying drawings wherein.

DETAILED DESCRIPTION OF THE PREFERRED EMBODIMENT

Figure 2:
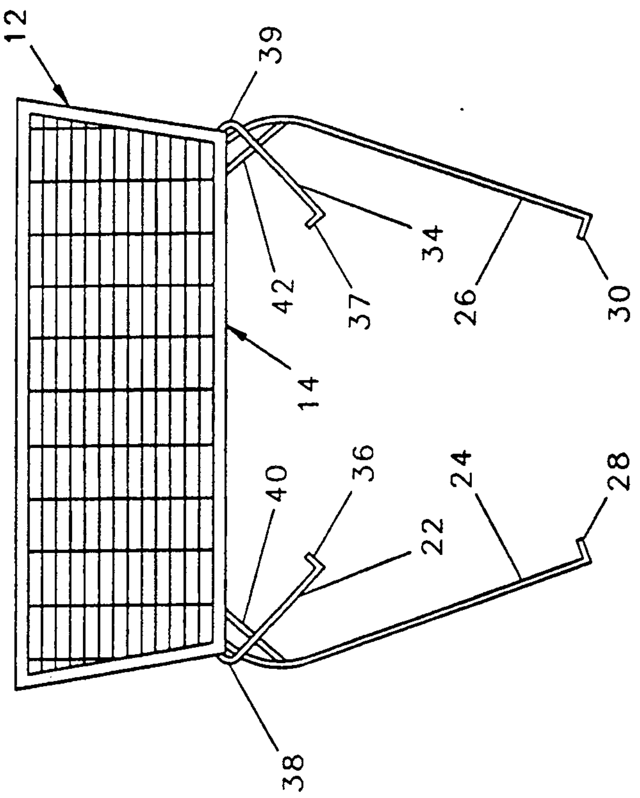
FIG. 2 is a rear elevational view of the structure in FIG. 1.
Figure 1:
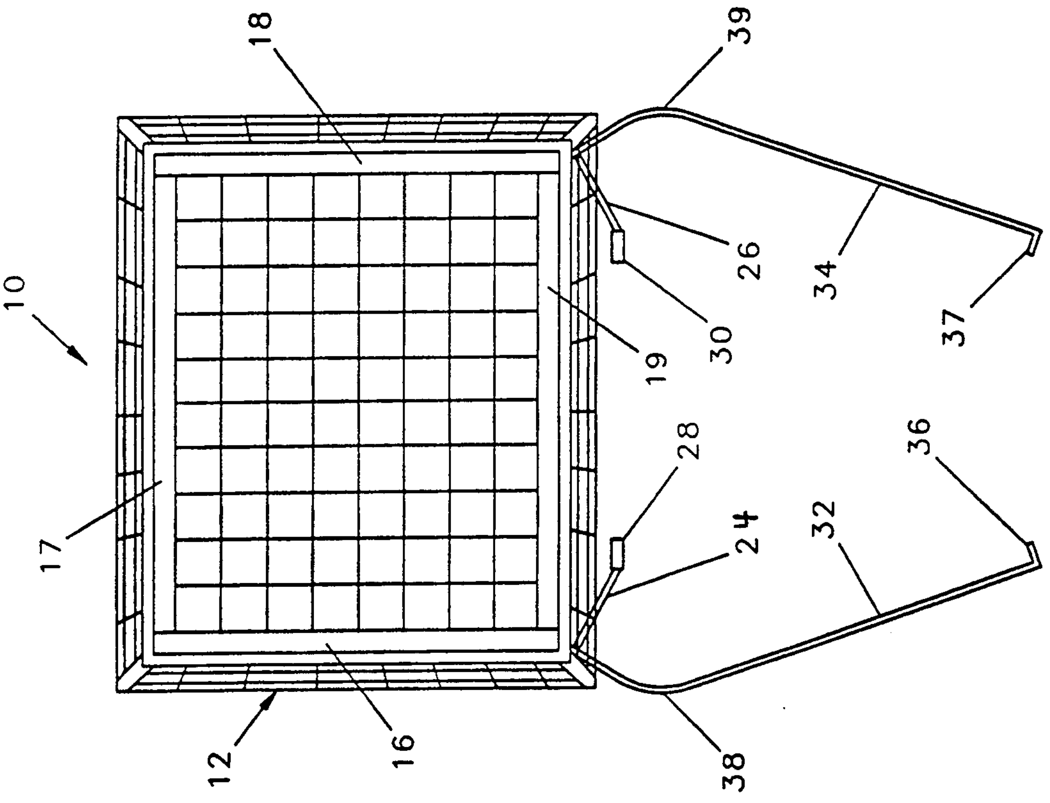
FIG. 1 is a top plan view of a support structure in accordance with the present invention where the body thereof is a basket.
Figure 3:
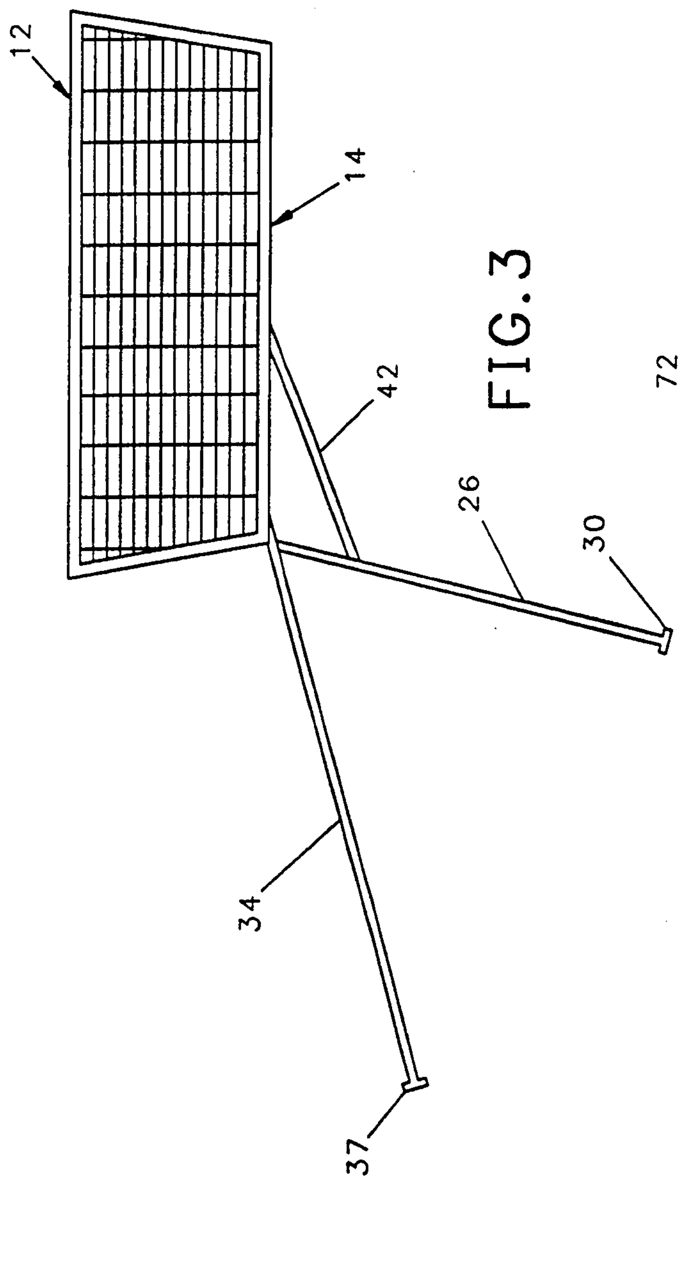
FIG. 3 is a side elevational view of the structure in FIG. 1.

Referring to FIGS. 1, 2 and 3, a support structure 10 in accordance with the present invention is shown in this case as having a body 12 in the shape of a basket and having a substantially planar base 14. The base 14 is substantially rectangular in shape and is maintained rigid by suitable elongate frame members 16, 17, 18, 19. The basket 12 is made of a suitable resilient wire such as customarily used for the construction of shopping carts and the like.

Figure 4:
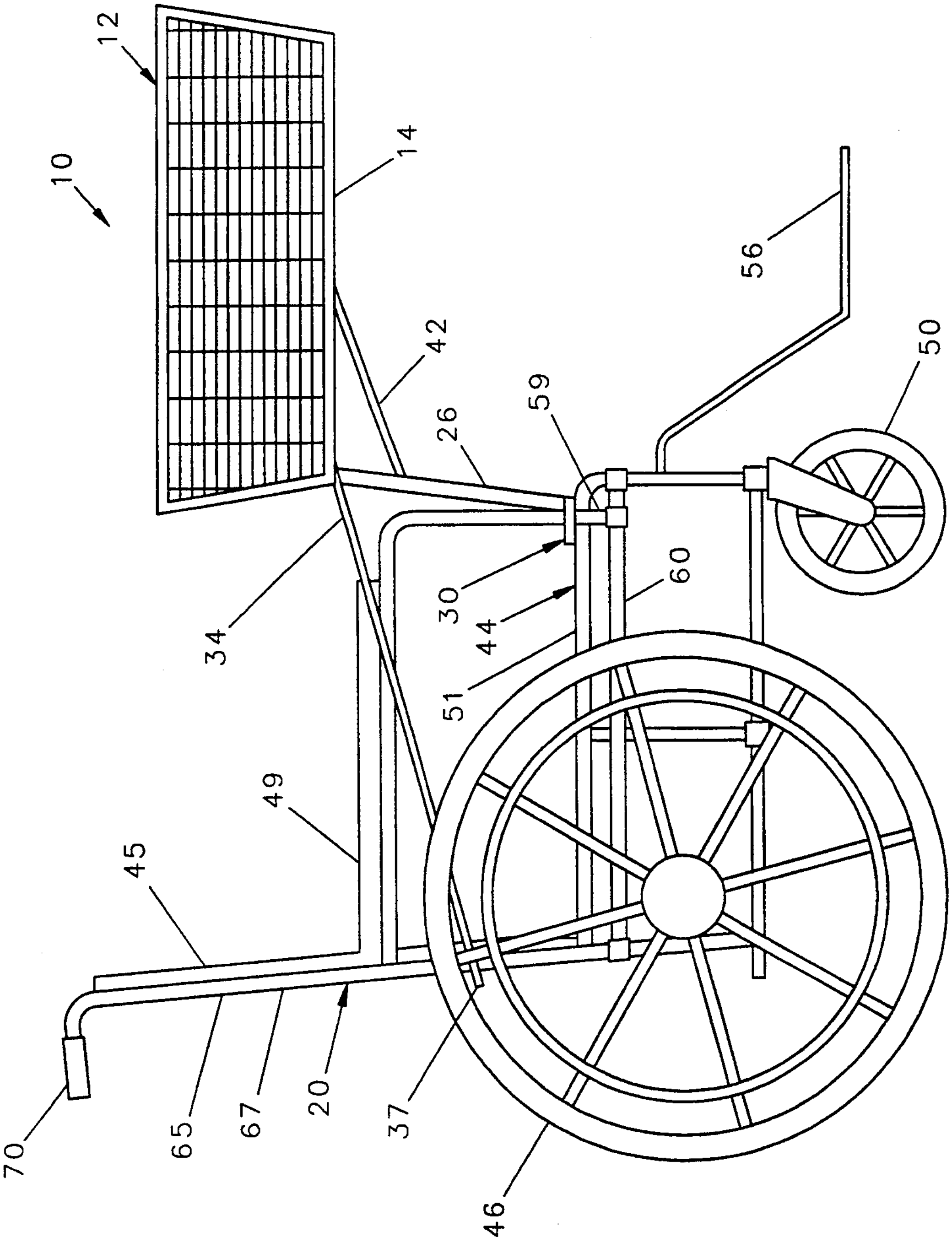
FIG. 4 is a side elevational view of a wheel chair to which the support structure in FIG. 1 has been attached.
Figure 5:
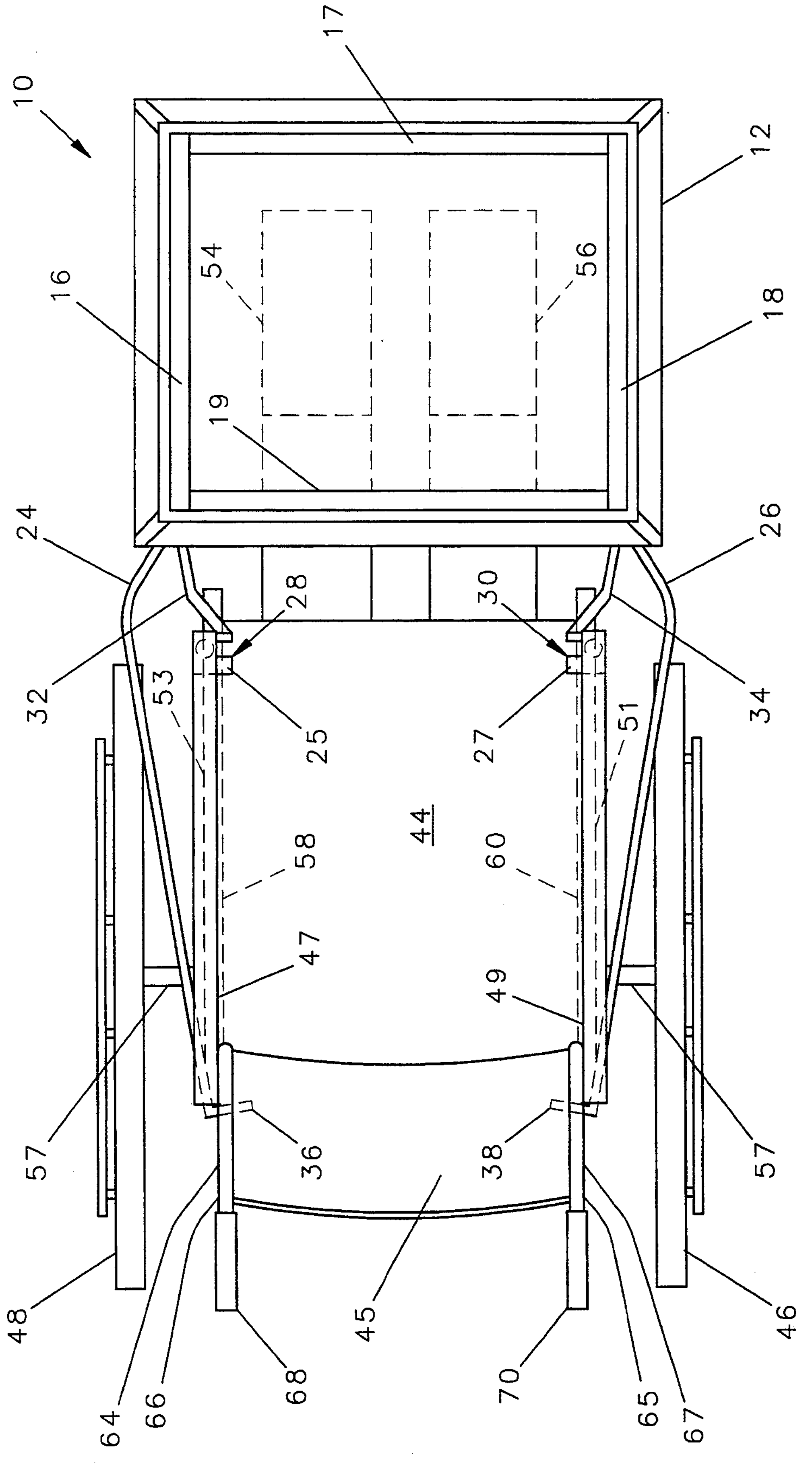
FIG. 5 is a top view of the wheel chair and support structure as shown in FIG. 4 with the side bars which extend along the seat of the wheel chair and the distal ends of the legs and arms of the structure shown in phantom lines.

Referring to FIG. 4, and 5, the support structure 10 is adapted to be attached to a wheel chair 20 with the basket 12 adapted to open upwardly for receiving packages and the like. For purposes of describing the support structure 10 it will be described as having a front, a back and two sides. The front of the support structure 10 shall be the portion generally adjacent frame member 17, and the back thereof shall be generally adjacent and extending away from frame member 19. Frame members 16 and 18 extend along each of the two sides of the support structure 10.

Figure 7A:
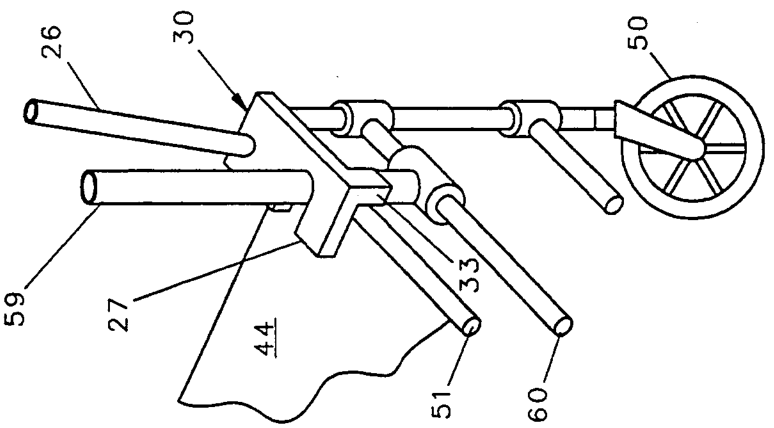
FIG. 7A is an enlarged fragmentary isometric view of a leg and a foot as shown in FIG. 7 attached to a wheel chair.
Figure 7:
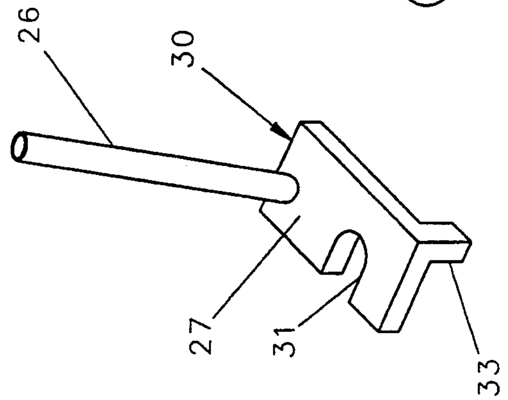
FIG. 7 is an enlarged fragmentary isometric view of a leg and a foot of the support member shown in FIG. 1.

Referring further to FIGS. 1, 2, 3 and 7, the support structure 10 is provided with a pair of downwardly extending legs 24, 26, one leg 24, 26 extending from each side of the base 14, and at the lower end of each of the legs 24, 26, a foot 28, 30. As can be seen in FIG. 2, FIG. 7 and 7*a* each foot 28, 30 extends inwardly towards the opposing foot 28, 30 and has a generally broad transverse surface 25, 27 which is adapted to rest upon the upper surface of the seat of the wheel chair and each foot 28, 30 has an inwardly facing notch, one of which 31 can be seen in FIG. 7, and a downwardly extending appendage 33, one of which is also shown in FIG. 7. Each notch 31 has the shape of a curve having a radius of at least ¾ inch for receiving a vertical member on a wheel chair as described below and shown in FIG. 7A and the appendage 33 rest against the outer edge of the seat of the wheel chair. The legs 24, 26 are further provided with additional support members 40, 42 which connect near the upper end of each leg 24, 26, respectively, to the associated side frame member 16, 18 of the base 14.

The support structure 10 has a pair of rearwardly extending arms 32, 34, one arm 32, 34 extending from each side of the base 14, and at the rearward end of each of the arms 32, 34 a finger 36, 37, respectively. As can be seen in FIGS. 1 and 2, the fingers 36, 37 extend generally inwardly and towards each other, and near the forward end of each arm 32, 34 are outwardly projecting bends 38, 39. The outwardly projecting bends 38, 39 permit the arms 32, 34 to be positioned on a wheel chair 20 as described below without interfering with other positions of the wheel chair 20. Also, the support structure 10 has a width which is a little wider than any wheel chair to which it is to be attached such that the arms 32, 34 and the legs 24, 26 can wrap around the outside of the arms 41, 43 of the wheel chair 20.

Each of the legs 24, 26, and each of the arms 32, 34 is made of a spring quality steel and attached to the under portion of frame members 16, 17, 18, 19 of the base 14 by any suitable means such as welding or the like. The legs 24, 26 and the arms 32, 34 are shaped such that the distal ends thereof angle inwardly towards each other as can be seen in FIGS. 1 and 2. The legs 24, 26 and the arms 32, 34 are made sufficiently strong such that they are able to support goods positioned in the basket 12 but are made of a sufficiently narrow gauge steel such that the distal ends of the legs 24, 26, and the distal ends of the arms 32, 34 can be pulled outwardly away from each other when the support structure 10 is positioned on a wheel chair 20. Once the structure 10 is positioned on a wheel chair, the spring of the steel will urge the distal ends of the arms 32, 34 and the distal ends of the legs 24, 26 towards each other and the structure 10 will be retained on a wheel chair 20, as described below.

Referring to FIGS. 4 and 5, the wheel chair 20 has a substantially horizontal seat 44 the side edges of which are defined by a pair of parallel side seat members 51, 53 and at the rear thereof, a substantially vertical back 45. On each side of the wheel chair 20 are large drive wheels 46, 48 and positioned forward of each of the drive wheels 46, 48 are casters 50, 52. Extending forwardly of the casters 50, 52 and below the level of the seat 44 are a pair of foot rests 54, 56. Above each side of the seat 44, and extending parallel to the outer edge of the seat 44 are a pair of arm rests 47, 49. These features are present on all wheel chairs.

In addition to the features above, which are common to all wheel chairs, virtually all wheel chairs also have a pair of side bars 58, 60, each of which extend from a position at the forward portion of the wheel chair 20 above a caster 50, 52 to a position near the back of the seat 45 above the axle 57 between the drive wheels 46, 48. The side bars 58, 60 are normally tubular in shape having a diameter of approximately one inch, and are positioned adjacent the outer edges of the seat 44 and are sometimes positioned below the level of the seating surface of the seat 44 as shown in FIG. 4.

Extending downwardly along each side of the front of the wheel chair 20 are vertical members, one of which 59 can be seen in FIG. 4. The vertical members 59 are usually made of one inch diameter metal tubing and the lower end of each extends toward one of the front casters 50, 52, and the upper end supports the forward end of one of the arms 32, 34. Midway along the length, each of the vertical members 59 also attach to one of the seat side members 51, 53 and to one of the side bars 58, 60.

To attach the legs 24, 26 of the support structure 10 to a wheel chair 20 the distal ends of the legs 24, 26 are separated and one foot 28, 30 is positioned over a forward portion of the seat 44. The transverse surfaces 25, 27 will each rest upon a portion of the seat side members 40, 42 and the inwardly facing notch 31 on each foot 28, 30 can be fitted around one of the vertical members 59, as shown in FIG. 7*a*. When each foot 28, 30 is positioned on the seat 44 as described above, the downwardly extending appendages 33 on each foot 28, 30 will abut against the outer edge of one of the seat side members 51, 53.

Figure 8:
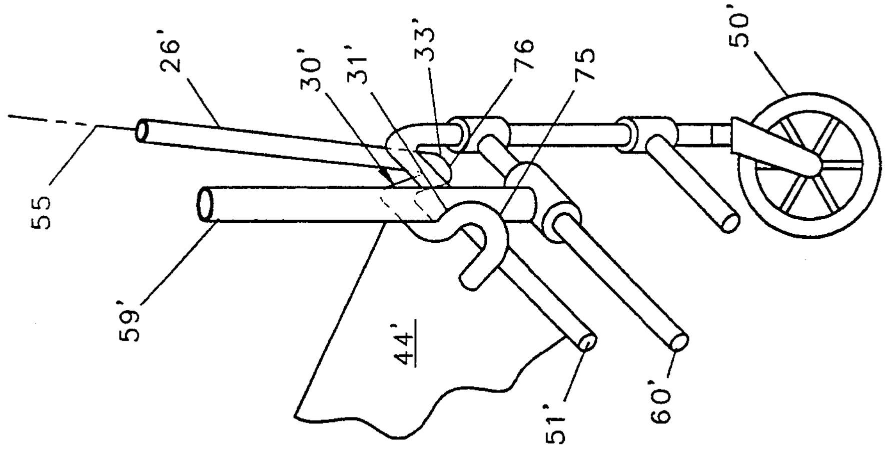
FIG. 8 is an enlarged fragmentary isometric view of another embodiment of a foot attached to a wheel chair.

Referring to FIG. 8, in which parts that are like parts shown in the first embodiment bear like numbers except they are primed, a second embodiment of a foot is shown which is attached to each of the legs which in their unstressed condition the distal ends thereof diverge away from each other. In this embodiment, each foot 30' is formed by bends within the length of the wire which is the distal end of the associated leg 26. Each foot 30' has a downwardly extending projection 33' formed by a 180 degree bend 76 therein and each foot 30' has an arcuate portion 31' of the wire which is in a plane substantially perpendicular to the axis 55 of the associated leg 26'. The arcuate portion 31' in this embodiment performs the same function as the notch 31 of the first embodiment, that is, the arcuate portion 31' is adapted to fit around the vertical member 59'. In this embodiment, however, the arcuate portion 31' of the foot 30' is adapted to fit around the portion of the vertical member 59' which is nearest the opposing vertical member 59' on the other side of the wheel chair. At the distal end of the wire 74 forming each leg 24, 26 and its associated foot 30', is a turn 75 which twists the distal end of the wire 74 such that it twice crosses over the side member 51, 53 upon which the foot 28, 30 is positioned. A support structure 10 having feet in accordance with this embodiment would be attached to the seat 44' of a wheel chair 20' by compressing the legs together and positioning each foot 30' between the vertical members 59' such that each notch 31' will receive and fit around one of the vertical member 59', and the downward projections 33' are fitted between the ends of the seat side members 51, 53 which extend forward of the forward end of the seat 44.

Figure 9A:
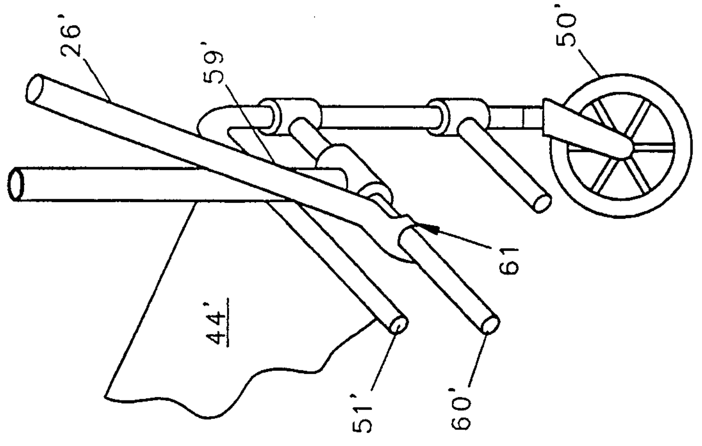
FIG. 9A is an enlarged fragmentary isometric view of the third embodiment of a leg and foot shown in FIG. 8 attached to a wheel chair.
Figure 9:
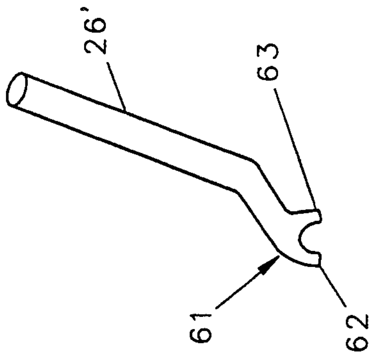
FIG. 9 is an enlarged fragmentary isometric view of a third embodiment of a foot for a support member such as shown in FIG. 1.

Referring to FIG. 9 and 9*a*, an alternate embodiment of a foot 61 is depicted. In this embodiment, each foot 61 attaches to a leg has a forked distal end having branches 62, 63 which are curved such that the branches 62, 63 of the foot 61 can be fitted on each side of one of the side bars 58', 60' instead of rested upon the seat 44' as was the case for the first embodiment.

All wheel chairs also have a back 45, the outer edges 64, 65 of which are defined by a pair of upwardly extending support bars 66, 67. At the upper ends of the support bars 66, 67 are rearwardly extending handles 68, 70 which can be gripped by a person seeking to push the wheel chair 20. The upwardly extending support bars 66, 67 are rigidly secured to the wheel chair 20. To attach the arms 32, 34 of the support structure 10 to the back 45 of wheel chair 20, the distal ends of the arms are separated sufficiently far apart to position the arms 32, 34 around the outer edges 64, 65 of the support bars 66, 67 and thereafter releasing the distal ends of the arms 34, 36 such that the spring action thereof will cause the fingers 36, 37 to hook around the rear of the back 45 of the seat 44 of the wheel chair 20.

Figure 6:
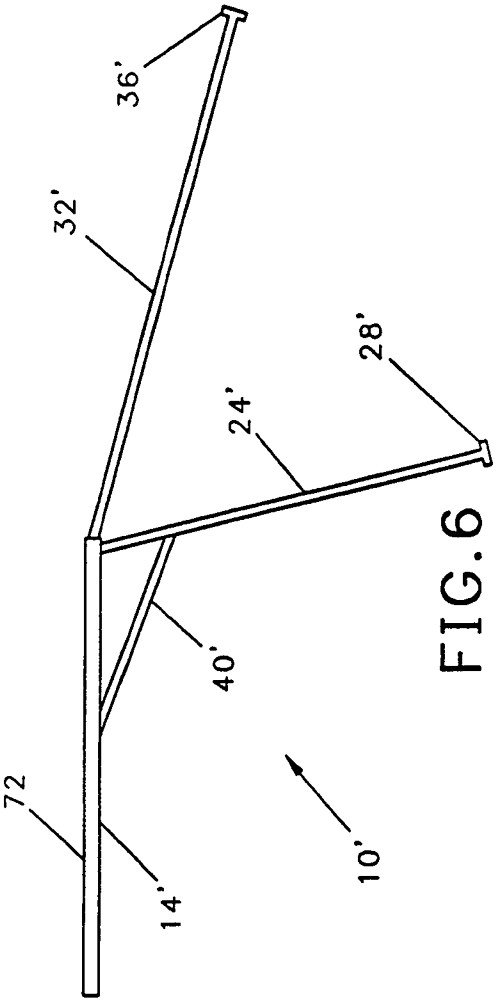
FIG. 6 is a side view of an alternate embodiment of the structure in the present invention wherein the body thereof is a desk or a tray.

A second embodiment of the support member is shown in FIG. 6 in which the portions thereof which correspond to like portions of the first embodiment are identified with like indicia numbers except the indicia numbers in the second embodiment are primed. The body of the support structure 10' shown in FIG. 6 is in the form of a table or tray 72.

Although the arms 32, 34 and legs 24, 36 of the present invention are described as being made of a spring steel such that the distal ends of the arms 24, 26 and the legs 32, 34 can be moved relative to one another by bending the spring material of which the arms 24, 26 and legs 32, 34 are respectively constructed, these appendages could be made of a less resilient material. The distal ends of the arms and legs could be biased by mounting the appendages on pivots attached to the base 14, 14' and attaching suitable springs between the appendages and the base which would bias the distal ends of the appendages as required. Furthermore, alterations could be made to the shape of the feet 28, 30 at the ends of each of the legs 24, 26, or alterations can be made to the shape of the fingers 36, 37 at the end of each arm 32, 34 to alter the attachment of the distal ends of these appendages to the a wheel chair 20.

There is, therefore, disclosed a support structure 10 which can be in the form of a basket 12 or tray 72 which is attachable to any of a number of designs of wheel chairs 20 as described above.

While the present invention has been described in connection with two embodiments, it should be appreciated by those skilled in the art that many changes may be made without departing from the true spirit and scope of the present invention. Therefore, it is the intent of the appended claims to cover all such changes and modifications that come within the true spirit and scope of this invention.

What is claimed:

1. A support structure for attachment to a wheelchair having a seat, a pair of side bars, one side bar extending substantially parallel to each side of said seat, and a back having substantially parallel upwardly extending outer edges, said support member comprising in combination:

a body having two sides, a pair of legs, each of said legs having an upper and a lower end, said lower ends of said legs being spring biased for movement toward and away from each other, said upper end of each of said legs connected to one of said sides of said body, each of said legs having a foot at said lower end thereof, and each said foot having a transverse portion for resting on a horizontal member, and a notch for receiving a vertical member of a wheelchair, a pair of arms, each of said arms having a forward and a rearward end, said forward end of each of said arms connected to one of said sides of said body,and attachment means on said rearward ends of said arms for attaching said arms to a seat of a wheelchair.

2. A support structure in accordance with claim 1 wherein said body is in the shape of a basket.

3. A support structure in accordance with claim 1 wherein said body is in the shape of a desk or a tray.

4. A support structure in accordance with claim 1 wherein said arms have rearward ends and said arms are made of a resilient spring steel and said rearward ends of said arms angle towards each other.

5. A support structure in accordance with claim 1 wherein said legs have rearward ends and said legs are made of a resilient spring steel and said rearward ends of said legs angle towards each other.

6. A support structure for attachment to a wheelchair having a seat, a pair of side bars, one side bar extending substantially parallel to each side of said seat, and a back having substantially parallel upwardly extending outer edges, said support member comprising in combination:

a body having two sides, a pair of legs, each of said legs having an upper and a lower end, said upper end of each of said legs connected to one of said sides of said body, each of said legs having a foot at said lower end thereof, a pair of arms, each of said arms having a forward and a rearward end, said forward end of each of said arms connected to one of said sides of said body, a finger on said rearward end of each of said arms for attaching each of said arms to an outer edge of a seat, each of said fingers extending inwardly toward the other of said fingers, and said rearward ends of said arms spring biased to retain said fingers around a back of a wheel chair.

7. A support structure in accordance with claim 6 wherein said body is in the shape of a basket.

8. A support structure in accordance with claim 6 wherein said body is in the shape of a desk or tray.

9. A support structure for attachment to a wheelchair having a seat, a pair of side bars, one side bar extending substantially parallel to each side of said seat, and a back having substantially parallel upwardly extending outer edges, said support member comprising in combination:

a body having two sides, a pair of legs, each of said legs having an upper and a lower end, said upper end of each of said legs connected to one of said sides of said body, each of said legs having a foot at said lower end thereof, a pair of arms made of a resilient spring steel, each of said arms having a forward and a rearward end, said forward end of each of said arms connected to one of said sides of said body, attachment means on said rearward end of each of said arms for attaching each of said arms to an outer edge of a seat of a wheelchair, and said rearward ends of said arms angled towards each other.

10. A support structure for attachment to a wheelchair having a seat, a pair of side bars, one side bar extending substantially parallel upwardly extending outer edges, said support member comprising in combination:

a body having two sides a pair of legs made of resilient spring steel each of said legs having an upper and a lower end, said lower ends of said legs angled towards each other, said upper end of each of said legs connected to one of said sides of said body, said lower ends having a foot at said lower end thereof, a pair of arms, each of said arms having a forward and a rearward end, said forward end of each of said arms connected to one of said sides of said body, and attachment means on said rearward ends of said arms for attaching said arms to a seat of a wheelchair.

* * * * *

UNITED STATES PATENT AND TRADEMARK OFFICE
CERTIFICATE OF CORRECTION

PATENT NO. : 5,356,059

DATED : October 18, 1994

INVENTOR(S) : John E. Yanez and John Sandford

It is certified that error appears in the above—identified patent and that said Letters Patent is hereby corrected as shown below:

In column 8, line 14, after "parallel" insert -- to each side of said seat, and a back having substantially parallel --

Signed and Sealed this

Thirteenth Day of December, 1994

Attest:

BRUCE LEHMAN

*Attesting Officer*

*Commissioner of Patents and Trademarks*